Dec. 12, 1967 P. A. PHILIPPIDIS 3,358,189

NETWORK PROTECTOR

Filed Aug. 25, 1965 3 Sheets-Sheet 1

Dec. 12, 1967 P. A. PHILIPPIDIS 3,358,189

NETWORK PROTECTOR

Filed Aug. 25, 1965 3 Sheets-Sheet 3

3,358,189
NETWORK PROTECTOR

Philip A. Philippidis, Astoria, N.Y., assignor to Consolidated Edison Company of New York, Inc., New York, N.Y., a corporation of New York Filed Aug. 25, 1965, Ser. No. 482,380
14 Claims. (Cl. 317—26)

This invention relates generally to network protectors for interconnecting distribution transformers to networks in power distribution systems, and more particularly to a solid state network protector which permits power to flow only from each transformer to the network and not from the network to the transformer.

In many cities in this country secondary networks are utilized in power distribution systems since they are considered to be the most economical means of giving a designated area where all wires are underground the required quality of service with adequate flexibility for growth. A secondary network is a distribution system in which the secondaries of the distribution transformers are connected to a common network for supplying light and power directly to consumers. The circuits of the network are generally operated at 120/208 volts, polyphase such as three-phase, four-wire. The networks are energized by means of network units to which power is supplied by primary feeders directly from the generating stations. These network units consist of network transformers and network protectors.

The network transformers in the network unit are three-phase and are usually immersed in liquid in self-cooled sealed tanks. A manually-operated oil-immersed switch is mounted on the primary side of the transformer.

The network transformer is connected to the network through a so-called "network protector," which in essence is a circuit breaker with relays and associated auxiliary devices and backup fuses which are all enclosed in a case that is commonly mounted on the secondary side of the transformer. The function of a network protector is two-fold:

(1) To open the circuit as soon as a power flow reversal tends to occur.

(2) To reclose the circuit when the voltage of the primary feeder is of the correct magnitude and phase angle with respect to the network voltage, so that when the network protector is reclosed, the power will flow from the feeder into the network.

The disadvantages of existing network protectors are that they contain moving parts and cannot be immersed in oils, and since these prior art network protectors are mechanical devices, they are invariably expensive, difficult to adjust and require frequent maintenance if the proper operating conditions are to be maintained.

The present invention provides circuit arrangements utilizing solid state devices to provide network protectors which contain no moving parts and which have the necessary unidirectional power flow properties. The network protector of the present invention is interposed between the feeder and the network. It will allow undistorted power to flow to the network as long as the current in the feeder is not leading the voltage by more than 5° nor lagging by more than 90°, and will prevent back feeding when the feeder is switched off at the station, i.e. it will prevent power from flowing from the network to the feeder in the event that the potential on the network side is higher than on the feeder side.

Briefly stated the network protectors of the present invention may utilize various types of solid state triggered unidirectional current flow devices, such as light activated diodes or switches, silicon controlled rectifiers, silicon controlled switches, or light activated silicon rectifiers as examples. The invention is applicable both to single-phase and poly-phase power circuits.

In one application of the present invention, for example, two light activated diodes are used in each phase of the power supply and each diode has associated with it a neon triggering bulb. When no light is present, light activated diodes offer high resistance to current flow in both directions. When the terminals of the light activated diodes are connected to a source of direct current energy of the proper polarity, a light trigger is needed to bring them to their diode state. Once they are in such state they remain in that condition even when the light is extinguished as long as the electrical circuit is not interrupted. If there is a reversal of polarity, however, as in the case of an alternating current circuit, this will result in the current going through zero and cause interruption of the electrical circuit through such a diode and therefore for alternating current operation triggering is needed on every half cycle. The two light activated diodes (associated with their respective neon bulbs) are connected in parallel and in opposition and are inserted between the feeder and the network. These components are so positioned in the circuit that the neon bulbs will light respectively on alternate half cycles. In this manner, the light actuated diodes are receiving light on alternate half cycles. Their polarity is chosen, however, such as to allow conduction of current when light impinges upon them only when the flow of power is from the feeder to the network. In the event that there tends to be power flow from the network to the feeder, i.e. reverse power flow, the neon bulbs will again be lighted respectively on alternate half cycles, but each one illuminates its diode at the instant that that diode is in reverse polarity to a flow of current coming from the network to the feeder. Thus, power can flow only from the feeder to the network and not from the network to the feeder.

When the network protector of the present invention is connected in the foregoing manner, full current conduction, i.e. an undistorted wave, results when the current varies from 30° to 120° lagging with reference to the input voltage. A partial output will exist when the current varies from 30° lag to 150° leading with respect to the network voltage, and a zero region output exists for all phase angles of the current from 150° leading to 240° leading with reference to the network voltage.

Network protectors should ideally have an undistorted output wave for all angles of current varying from zero to 90° leading or lagging the input voltage, and a zero output when the current varies from 90° to 180° leading or lagging the input voltage. In practice, however, since the load is usually inductive, it is ordinarily necessary to consider only cases where the current is in phase or lags the input voltage. To meet these conditions, the network protectors of the present invention accordingly preferably embody features to cause a phase advance of the triggering pulse and a limitation of the pulse duration. According to one example, phase advancing of the triggering pulse may be achieved by so connecting the trigger circuit across two phases of the circuit to achieve that result, and the pulse duration may be limited by so connecting the trigger circuit to the other or remaining phase of the three-phase power network. This will effectively quench the neon bulb at the instant when the third phase approaches the instantaneous potential of the second phase. As hereinafter explained in further detail, by these expedients a network protector is provided which will insure a satisfactory amount of power flow for a satisfactory proportion of each cycle and which will insure against any reverse flow of power.

These and other objects and features of the present invention will appear from the following detailed description of several embodiments of the invention to be read in conjunction with the accompanying drawings wherein similar components in the different views are identified by the same reference numeral. In the drawings.

Figures 1, 2, 3:
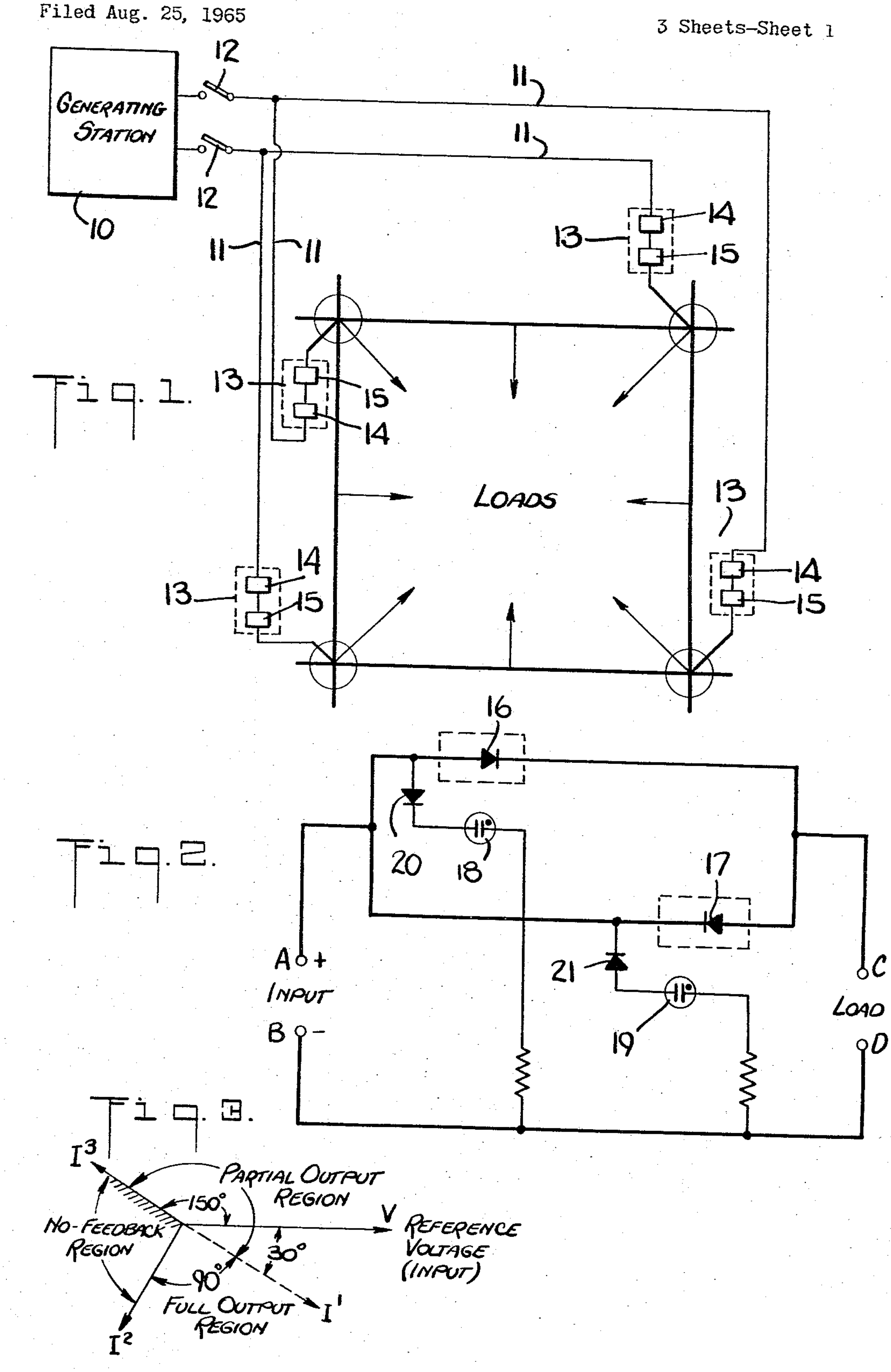
FIG. 1 is a schematic diagram of a secondary network and primary feeders of a power distribution system. While it will be understood that, in the interests of simplicity, this is shown as a "single line" or "one wire" schematic diagram of the system, actually the circuits will usually be three-phase four wire power circuits.
FIG. 2 is a schematic diagram of a simple form of single phase network protector in accordance with the present invention and using light activated diodes and neon bulbs.
FIG. 3 is a vector diagram illustrating the voltage and current relationships for the circuit illustrated in FIG. 2.

Referring now to the figures and particularly to FIG. 1, there is schematically illustrated by a line diagram, a portion of a typical power distribution system utilizing primary feeders and secondary networks. The numeral 10 identifies the generating station or source of power and the numeral 11 identifies the primary feeders. The primary feeders are protected by circuit breakers as at 12. The primary feeders lead to network vaults 13 which each include a network transformer 14 and a network protector 15. The network is formed by connecting together at each street intersection (indicated by circles) all conductors of each phase respectively, both those along the north-south streets and those along the east-west streets for example.

From this diagram, it will be apparent that the network, for example at each typical street intersection, will be supplied with power from one of the feeders 11, but that if such feeder should be interrupted accidentally, or for repair or replacement, then feeders to the network at other intersections will continue in operation for maintaining the power to the whole network. Thus, if for any reason it is desired to isolate one of the feeders for repair or replacement, this cannot be done simply by opening its circuit breaker 12 in the absence of the network protector, because the voltage of the network would still be applied thereto, and thus it is the function of the network protector to insure that this will not happen when it is desired to isolate one of the feeders.

When network protectors as at 15 are interposed between each feeder 11 and the network, they will permit power to flow to the network and will prevent back feeding from the network to the feeder when the feeder is switched off as at a circuit breaker 12. In this manner the feeder can be isolated at both ends and can be safely grounded.

In FIG. 2 there is illustrated schematically a simple form of single phase network protector in accordance with the present invention using two light activated diodes 16 and 17, each having associated with it respectively a neon bulb as at 18 and 19.

The light activated diodes 16 and 17 illustrated in FIG. 2 are two terminal (anode and cathode) elements. When not subject to light these diodes offer high resistance to current flow in both directions. When the terminals are connected to the proper polarities, light triggering is needed in order to bring them to their diode state. Once in such state they remain in that state even when the light is extinguished as long as the current in the photo diode circuit is not interrupted. In the event of a reversal of polarities, such as in the case of alternating current, triggering is needed for every half cycle.

In FIG. 2 the input terminals are labeled A and B and the output terminals are labeled C and D. If an alternating current source is connected between the points A and B, the neon bulbs 18 and 19 will light but not simultaneously since each of them is connected to a diode 20 or 21 of different polarity. It can therefore be seen that the light actuated diodes 16 and 17 will receive light on alternate half cycles. Their polarity, however, is chosen such as to allow conduction of current only when light impinges upon them.

At the instant that terminal A is positive and terminal B is negative, neon bulb 18 will light due to the polarity of the rectifier 20 associated therewith. In the condition illustrated in FIG. 2, the diode 16 will therefore receive light and will conduct since it has the proper polarity. The circuit is completed through the load connected between points C and D. For the polarities indicated in FIG. 2 the neon bulb 19 will not light due to the polarity of the rectifier 21 associated therewith. For this condition, therefore, diode 17 will not receive light and will not conduct.

On the following half cycle, i.e. when terminal A is negative, the terminal B is positive, neon bulb 19 will light and the associated diode 17 will conduct. The circuit is again connected through the load connected between points C and D. On this half cycle the neon bulb 18 will not light and therefore the diode 16 will not conduct.

In the preceding example it was assumed that power was flowing from the input terminals A and B to the output terminals C and D. If the source of power is connected between the points C and D and the output load is connected between the points A and B, the neon bulbs 18 and 19 cannot light and therefore no conduction is possible and no current will flow through the load. This illustrates that the network protector of the present invention is truly unidirectional, i.e. that it will allow power to flow in one direction but not in the other direction.

In the preceding examples, it was assumed that the network protector of the present invention was connected between the source of power and a load and these were interchanged to show that power could flow in one direction but not in the other. If the network protector illustrated in FIG. 2 is connected between two alternating current sources ( of course of the same frequency and essentially in phase), i.e. if one alternating current source is connected between the points A and B, another alternating current source is connected between the points C and D, as is the case when this protector is used in the circuit of FIG. 1, then current will flow through the circuit only if the alternating current source connected between points A and B is of a higher instantaneous voltage than the alternating current source connected between the points C and D. If the power source connected between terminals C and D is of a high instantaneous voltage than the power source connected between the terminals A and B, no current can flow through the circuit for the following reasons. In this example, if the potential across the points C and D is greater than the potential across the points A and B, the neon bulbs 18 and 19 will light but each will illuminate a diode 16 or 17 respecttively at the instant that that particular diode is in reverse polarity to a flow of current coming from the terminals C and D. Therefore, the diode will not conduct and there can be no flow of power from the output to the input.

It can, therefore, be seen that the circuit of FIG. 2 functions as a network protector since it has unidirectional power flow characteristics. This is true whether a power source and a load are applied thereto, or two power sources are applied thereto as above described. In this circuit power can flow from the input to the output but never from the output to the input. Accordingly, if this protector is connected between a feeder and a network it will permit power to flow to the network but will not allow power to flow from the network to the feeder.

The protector of FIG. 2 will allow full current conduction (undistorted wave) when the triggering pulse varies from 30° to 120° lagging with reference to the input voltage. A partial output exists when the trigger varies from 30° lagging to 150° leading with respect to the network voltage. A zero output region exists for all phase angles of the trigger from 150° leading to 240° leading with reference to the network voltage. This is illustrated in FIG. 3 where a vector representing the reference input voltage is indicated by the letter V in its angular relationship at a given moment with respect to a vector I' at an angle indicating the current when lagging such voltage by 30°. Vector $I^2$ indicates the current when lagging such voltage by 120°; and vector $I^3$, the current when leading the voltage by an angle of 150°. If superposed sine waves are drawn representing the alternating voltage and the alternating current respectively when the current is leading or lagging the voltage by different amounts, it will be found that the operation of the circuit of FIG. 2 will be such that the outputs (or lack of output) will be as per the notations on FIG. 3.

While the circuit of FIG. 2, when used as a network protector, and having the characteristics as shown in FIG. 3, will be operative, yet it is preferred that such characteritsics be improved so as to effectively conduct the current during the interval of each half cycle when the diode is in the proper condition for conduction. The characteristics which the circuit ideally should have, are as follows:

(1) Undistorted output wave for all angles of current varying from zero to 90° leading or lagging the input voltage.

(2) A zero output region for all angles from 90° to 180° leading or lagging the input voltage.

Figures 4, 5, 6:
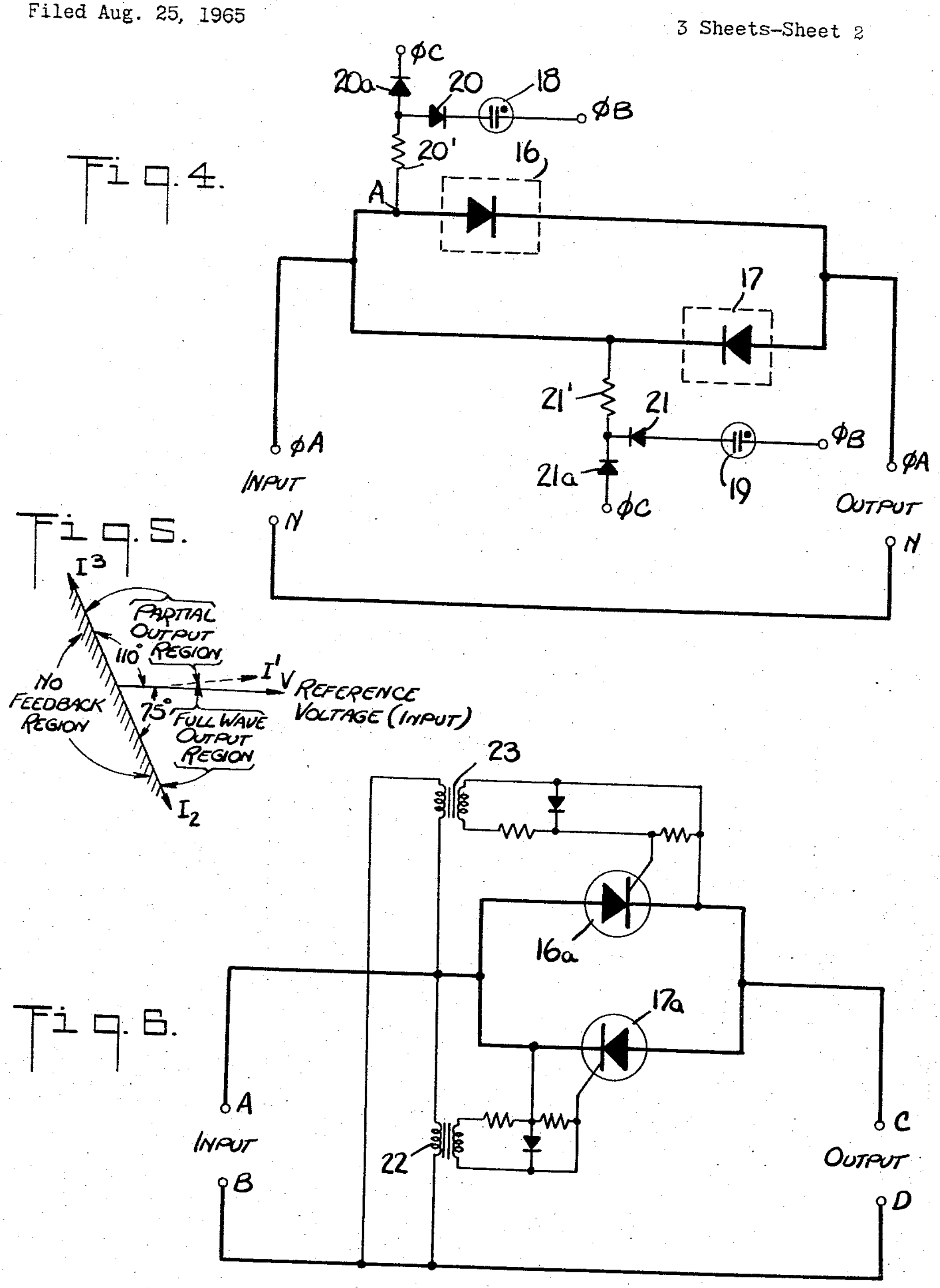
FIG. 4 is a view similar to FIG. 2 and illustrates the circuit connections for phase advancing the trigger and for restricting its pulse duration.
FIG. 5 is a view similar to FIG. 3 but illustrating the voltage-current relationship for the circuit illustrated in FIG. 4.
FIG. 6 is a view similar to FIG. 2 and illustrates a circuit using silicon controlled rectifiers.

Since the circuits in which the network protector of FIG. 2 are to be used are ordinarily inductive, the circuit should preferably only be designed for cases where the current is in phase or lagging the voltage. In order to accomplish this the circuit may be modified as illustrated in FIG. 4, which produces the following results:

(1) An undistorted fullwave output for all angles varying from a few degrees leading to 75° lagging.

(2) A partial output (distorted wave) from a few degrees leading to 110° leading (the output decreasing as the angle increases).

(3) A zero output region for all angles other than those stated above.

The results (for example, with a phase sequence of A leads B, leads C) of this modification are illustrated in FIG. 5 in a manner corresponding to that of FIG. 3. The modification of the circuit illustrated in FIG. 2 to achieve these results, involve the following:

(1) Phase advancing of the triggering pulse which is achieved by connecting the trigger circuit across two of the phases of a three phase power source.

(2) Limiting the pulse duration of the triggering pulse. This is achieved by a connection to the third phase which quenches the neon bulb 18 or 19 at the instant when the third phase approaches the potential of the second phase.

A circuit like that of FIG. 2, but containing these modifications, is illustrated in FIG. 4. Here the main circuit containing the light triggered diodes 16 and 17 is connected between phase A and neutral N. The trigger circuits, which include respectively the neon bulbs 18 and 19, are connected between phases A and B in order to advance the trigger pulse in the manner illustrated in FIG. 5. The trigger circuit is also connected to phase C in order to quench the neon bulb when the instantaneous potential of phase B approaches the potential of phase C. Diodes 20*a* and 21*a* are interposed between the connection from the trigger circuit to phase C in order to insure flow of current in the proper direction. As illustrated in FIG. 4, limiting resistors are inserted in the triggering circuit in the usual manner and for the usual purposes inherent in such circuits.

Figure 7:
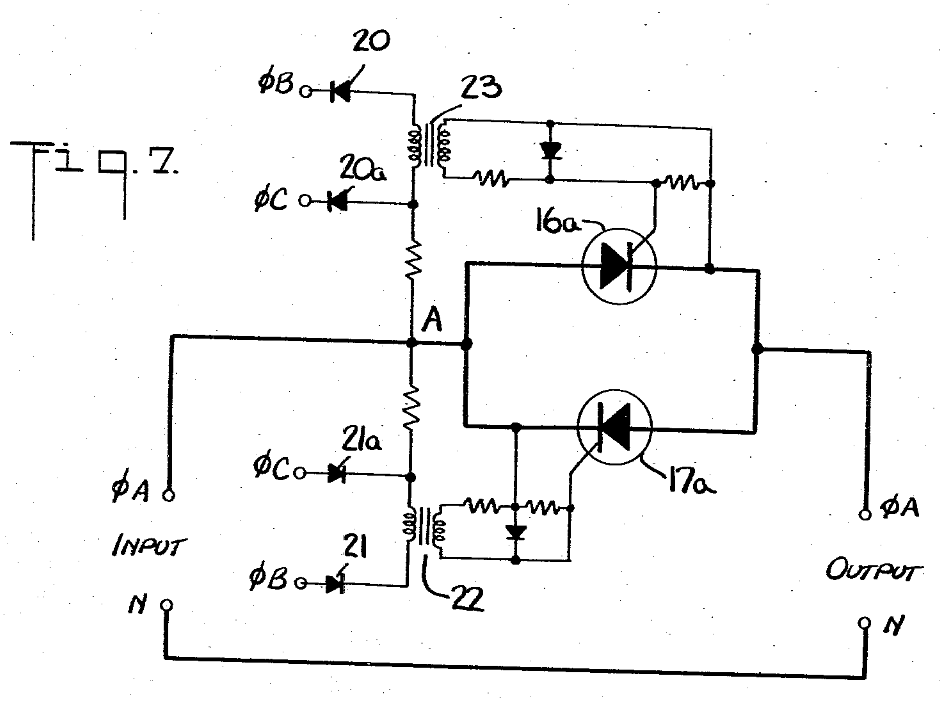
FIG. 7 is a view similar to FIG. 4 and illustrates the circuit connections for phase advancing the trigger and for restricting its pulse duration for the circuit illustrated in FIG. 6.

The circuit illustrated in FIG. 6 is generally the equivalent of the circuit illustrated in FIG. 2 with the exception that silicon controlled rectifiers 16*a* and 17*a* have replaced the light activated diodes 16 and 17, these rectifiers 16*a* and 17*a* being connected in parallel and in opposition. As here illustrated, the silicon controlled rectifiers receive triggering pulses through separate transformers 22 and 23. One of these rectifiers is pulsed during the positive half cycle of the input voltage while the other is triggered during the negative half cycle. The phase characteristics of the circuit of FIG. 6 can be improved if the triggering pulse is phase advanced by 30° and the duration of the triggering pulse is restricted to less than 120°. In order to accomplish this, this circuit is modified as illustrated in FIG. 7, such modifications being generally equivalent to those illustrated in FIG. 4.

Figure 8:
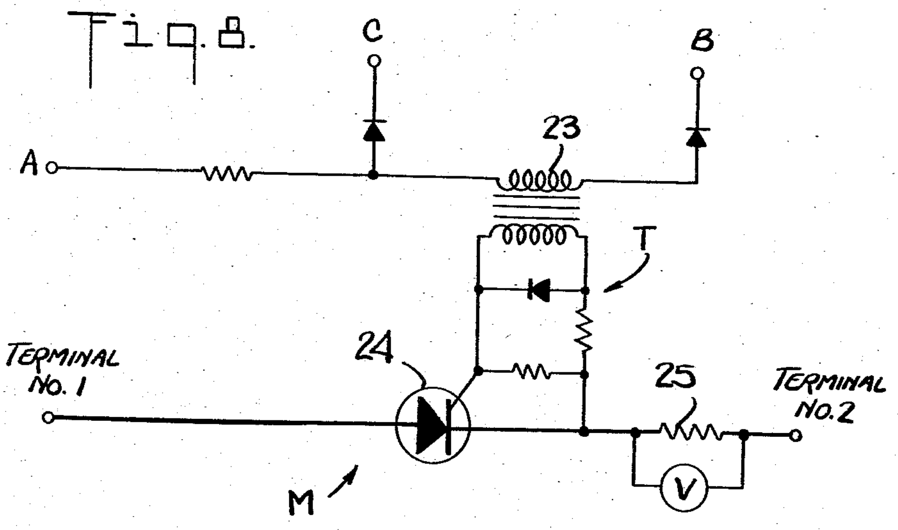
FIG. 8 illustrates a circuit for determining the phase characteristics of the network protector in accordance with the present invention.

In describing the various network protector circuits above, it was stated that it was desirable to advance in phase the triggering pulse and to limit the duration thereof. A detailed analysis of how this is accomplished will now be presented with reference to a network protector which utilizes silicon controlled rectifiers. The circuit illustrated in FIG. 8 is in substance one half of such a single phase network protector. Here there is incorporated a triggering circuit T and a main circuit M, and the triggering circuit is of the phase advanced and pulse width restricted type. A pulse is produced in transformer 23 due to the flow of current from A to B at positive half cycles. The pulse is clipped by the action of phase C when phase C is more negative than phase B.

The main circuit M which includes the silicon controlled rectifier 24 and the resistive load 25 is located between the terminals identified by the numerals 1 and 2. The reference voltage is that obtained when terminal 1 is connected to phase A and terminal 2 is connected to ground (or neutral, as indicated at N in FIG. 7). With this connection, the pulse always leads the current in the silicon controlled rectifier by 30° and the pulse collapses at 90° lag from the start of the reference voltage. The output voltage across the resistive load is in this case an undistorted half wave.

In order to study the output wave with respect to current in the silicon controlled rectifier 24 at different phase angles with respect to the reference voltage, the triggering circuit can be modified by varying the connections at terminals 1 and 2 of the main circuit. By choosing different connections to an available three-phase supply, it is possible to obtain voltages at 30° intervals around the reference voltage. The results are tabulated in Table I which shows that the output voltage across the resistive load 25 is constant (perfect half wave) for all angles of current from 0° to 60° lagging. A sharp cutoff exists between 60° and 90° lagging since the voltage at 90° lagging is practically zero. At leading values of current, a gradual decrease of voltage is noted. This decrease starts from a few degrees leading until at 150° leading only 10% of the voltage persists.

TABLE I

| Terminal #1 | Terminal #2 | Volts Across Load | $\sqrt{3}$ Correction for Phase Volt | Angle with Respect to Reference Voltage |
|---|---|---|---|---|
| N | A | .57 | .97 | +180° |
| C | A | 12.3 | 12.3 | +150° |
| C | N | 18.8 | 32.6 | +120° |
| C | B | 63 | 63 | +90° |
| N | B | 47.5 | 82.5 | +60° |
| A | B | 102 | 102 | +30° |
| A | N | 61 | 106 | [1] 0° |
| A | C | 106 | 106 | −30° |
| N | C | 62 | 107.5 | −60° |
| B | C | .5 | .86 | −90° |
| B | N | .47 | .81 | −120° |
| B | A | .57 | .97 | −150° |

[1] Reference voltage.

The network protector of the present invention is applicable to both single phase and poly-phase circuits. For three phase operation, a network protector, such as those illustrated, is inserted in each phase. The network protector inserted in each phase must be correctly connected to the other phases for proper advancing and pulse limitation of the trigger pulse.

What has been described is a solid state network protector which has unidirectional power flow properties and zero feedback. It is to be understood that although several preferred embodiments of the invention have been shown, these are merely meant as illustrations of the invention and not as limitations thereof.

What is claimed and desired to be secured by Letters Patent is:

1. A network protector for insertion in an alternating current power distribution system to interconnect a feeder with a network for permitting power to flow from the feeder to the network and for preventing power from flowing from the network to the feeder, said protector comprising a pair of semiconductor switches having unidirectional current flow properties, each of said switches having associated therewith a trigger for rendering said switches conductive when triggered thereby, and said switches being connected in parallel and in opposition between said feeder and said network whereby when the potential on the feeder side is higher than the potential on the network side said triggers respectively will be energized on alternate half cycles when said switches are at a polarity which will permit conduction, whereby power will flow from said feeder to said network and whereby when the potential on the network side is higher than on said feeder side, the triggers respectively will be energized on alternate half cycles when said switches are at a polarity which will not permit conduction, whereby power will then not flow from said network to said feeder.

2. A network protector for insertion in an alternating current power distribution system to interconnect a feeder with a network for permitting power to flow from the feeder to the network and, for preventing power from flowing from the network to the feeder, said protector comprising a pair of semiconductor switches having unidirectional current flow properties, each of said switches having associated therewith a trigger for rendering said switches conductive when triggered thereby, circuit means for phase advancing said triggers, and said switches being connected in parallel and in opposition between said feeder and said network whereby when the potential on the feeder side is higher than the potential on the network side said triggers respectively will be energized on alternate half cycles when said switches are at a polarity which will permit conduction, whereby power will flow from said feeders to said network and whereby when the potential on the network side is higher than on said feeder side, the triggers respectively will be energized on alternate half cycles when said switches are at a polarity which will not permit conduction, whereby power will then not flow from said network to said feeder.

3. A network protector for insertion in an alternating current power distribution system to interconnect a feeder with a network for permitting power to flow from the feeder to the network and for preventing power from flowing from the network to the feeder, said protector comprising a pair of semiconductor switches having unidirectional current flow properties, each of said switches having associated therewith a trigger for rendering said switches conductive when triggered thereby, circuit means for limiting the time when said trigger is energized, and said switches being connected in parallel and in opposition between said feeder and said network whereby when the potential on the feeder side is higher than the potential on the network side said triggers respectively will be energized on alternate half cycles when said switches are at a polarity which will permit conduction, whereby power will flow from said feeders to said network and whereby when the potential on the network side is higher than on said feeder side, the triggers respectively will be energized on alternate half cycles when said switches are at a polarity which will not permit conduction, whereby power will then not flow from said network to said feeders.

4. A network protector for insertion in an alternating current power distribution system to interconnect a feeder with a network for permitting power to flow from the feeder to the network and for preventing power from flowing from the network to the feeder, said protector comprising a pair of semiconductor switches having unidirectional current flow properties, each of said switches having associated therewith a trigger for rendering said switches conductive when triggered thereby, circuit means for phase advancing said triggers, circuit means for limiting the time when said trigger is energized, and said switches being connected in parallel and in opposition between said feeder and said network whereby when the potential on the feeder side is higher than the potential on the network side said triggers respectively will be energized on alternate half cycles when said switches are at a polarity which will permit conduction whereby power will flow from said feeders to said network and whereby when the potential on the network side is higher than on said feeder side, the triggers respectively will be energized on alternate half cycles when said switches are at a polarity which will not permit conduction, whereby power will then not flow from said network to said feeders.

5. A network protector in accordance with claim 1 wherein said power distribution system is three phase and said trigger is connected between two phases in order to phase advance the firing of said trigger.

6. A network protector in accordance with claim 5 wherein said trigger is connected to a third phase whereby the duration of said trigger energization is limited.

7. A network protector for insertion in a polyphase alternating current power distribution system to interconnect the feeders and the network for permitting power to flow from the feeders to the network and for preventing power from flowing from the network to the feeders, said protector comprising a plurality of semiconductor switches having unidirectional flow properties and which must be triggered in order to conduct, each of said switches having associated therewith a trigger, and a pair of said switches and associated triggers being connected in parallel and in opposition in each phase between said feeders and said network whereby when the potential on the feeder side is higher than the potential on the network side said triggers respectively will be energized on alternate half cycles when said switches are at a polarity which will permit conduction whereby power will flow from said feeders to said network and whereby when the potential on the network side is higher than on said feeder side, the triggers respectively will be energized on alternate half cycles when said switches are at a polarity which will not permit conduction, whereby power will then not flow from said network to said feeders.

8. A network protector for insertion in a polyphase alternating current power distribution system to interconnect the feeders and the network for permitting power to flow from the feeders to the network and for preventing power from flowing from the network to the feeders, said protector comprising a plurality of semiconductor switches having unidirectional flow properties and which must be triggered n order to conduct, each of said swtiches having associated therewith a trigger, circuit means for phase advancing said triggers, circuit means for limiting the time when said trigger is energized, and a pair of said switches and associated triggers being connected in parallel and in opposition in each phase between said feeders and said network whereby when the potential on the feeder side is higher than the potential on the network side said triggers respectively will be energized on alternate half cycles when said switches are at a polarity which will permit conduction whereby power will flow from said feeders to said network and whereby when the potential on the network side is higher than on said feeder side, the triggers respectively will be energized on alternate half cycles when said switches are at a polarity which will not permit conduction, whereby power will then not flow from said network to said feeders.

9. A network protector for insertion in an alternating current power distribution system to interconnect a feeder with a network for permitting power to flow from the feeder to the network and for preventing power from flowing fom the network to the feeder, said protector comprising a pair of light activated switches having unidirectional current flow properties and which must be triggered in order to conduct, each of said switches having associated therewith a light source to trigger said switch, and said switches being connected in parallel and in opposition between said feeders and said network whereby when the potential on the feeder side is higher than the potential on the network side said triggers respectively will be energized on alternate half cycles when said switches are at a polarity which will permit conduction whereby power will flow from said feeders to said network and whereby when the potential on the network side is higher than on said feeder side, the triggers respectively will be energized on alternatae half cycles when said switches are at a polarity which will not permit conduction, whereby power will not flow from said network to said feeders.

10. A network protector for insertion in an alternating current power distribution system to interconnect the feeders and the network for permitting power to flow from the feeders to the network and for preventing power from flowing from the network to the feeders, said protector comprising a pair of light activated switches having unidirectional current flow properties and which must be triggered in order to conduct, each of said switches having associated therewith a light source to trigger said switch, said trigger light sources being connected between two adjacent phases to phase advance the triggering pulse and said trigger being also connected to a third phase to limit the duration of said trigger pulse, and said static switches being connected in parallel and in opposition between said feeders and said network whereby when the potential on the feeder side is higher than the potential on the network side said triggers respectively will be energized on alternate half cycles when said switches are at a polarity which will permit conduction whereby power will flow from said feeders to said network and whereby when the potential on the network side is higher than on said feeder side, the triggers respectively will be energized on alternate half cycles when said switches are at a polarity which will not permit conduction, whereby power will not flow from said network to said feeders.

11. A network protector for insertion in an alternating current power distribution system to interconnect a feeder with a network for permitting power to flow from the feeder to the network and for preventing power from flowing from the network to the feeder, said protector comprising a pair of silicon controlled rectifier switches having unidirectional current flow properties and which must be triggered by a pulse in order to conduct, each of said switches having associated therewith a transformer for delivering trigger pulses to said switches, and said switches being connected in parallel and in opposition between said feeder and said network whereby when the potential on the feeder side is higher than the potential on the network side said triggers respectively will be energized on alternate half cycles when said switches are at a polarity which will permit conduction whereby power will flow from said feeders to said network, and whereby when the potential on the network side is higher than on said feeder side, the triggers respectively will be energized on alternate half cycles when said switches are at a polarity which will not permit conduction, whereby power will then not flow from said network to said feeders.

12. A network protector for insertion in an alternating current power distribution system to interconnect the feeders and the network for permitting power to flow from the feeders to the network and for preventing power from flowing from the network to the feeders, said protector comprising a pair of light activated switches having unidirectional current flow properties and which must be triggered in order to conduct, each of said switches having associated therewith a light source to trigger said switch, said trigger transformers being connected between two adjacent phases to phase advance the triggering pulse and said trigger being also connected to a third phase to limit the duration of said trigger pulse, and said static switches being connected in parallel and in opposition between said feeders and said network whereby when the potential on the feeder side is higher than the potential on the network side said triggers respectively will be energized on alternate half cycles when said switches are at a polarity which will permit conduction whereby power will flow from said feeders to said network and whereby when the potential on the network side is higher than on said feeder side, the triggers respectively will be energized on alternate half cycles when said switches are at a polarity which will not permit conduction, whereby power will not flow from said network to said feeders.

13. A network protector for insertion in a polyphase alternating current power distribution system to interconnect the feeders and the network for permitting power to flow from the feeders to the network and for preventing power from flowing from the network to the feeders, said protector comprising a plurality of semi-conductor switches having unidirectional flow properties and of a type requiring triggering an order to conduct, each of said switches having triggering means associated therewith, and a pair of said switches and associated triggering means being connected in parallel and in opposition in each phase between said feeders and said network whereby when the potential on the feeder side is higher than the potential on the network side, said triggering means respectively will be energized on alternate half cycles when said switches are at a polarity which will permit conduction, whereby power will flow from said feeders to said network and whereby when the potential on the network side is higher than on said feeder side, the triggering means respectively will be energized on alternate half cycles when said switches are at a polarity which will not permit conduction, whereby power will then not flow from said network to said feeders.

14. A network protector for insertion in a polyphase alternating current power distribution system to interconnect the feeders and the network for permitting power to flow from the feeders to the network and for preventing power from flowing from the network to the feeders, said protector comprising a plurality of semi-conductor switches having unidirectional flow properties and of a type requiring triggering in order to conduct, each of said switches having triggering means associated therewith, circuit means for phase advancing said triggering means, circuit means for limiting the time when said triggering means is energized, and a pair of said switches and associated triggering means being connected in parallel and in opposition in each phase between said feeders and said network whereby when the potential on the feeder side is higher than the potential on the network side, said triggering means respectively will be energized on alternate half cycles when said switches are at a polarity which will permit conduction whereby power will flow from said feeders to said network and whereby when the potential on the network side is higher than on said feeder side, the triggering means respectively will be energized on alternate half cycles when said swtiches are at a polarity which will not permit conduction, whereby power will then not flow from said network to said feeders.

References Cited

UNITED STATES PATENTS

| | | | |
|---|---|---|---|
| 3,128,422 | 4/1964 | Brown | 321—47 X |
| 3,262,047 | 7/1966 | Hochberg | 321—43 |
| 3,313,960 | 4/1967 | Borys | 317—124 X |

MILTON O. HIRSHFIELD, *Primary Examiner.*

J. D. TRAMMELL, *Assistant Examiner.*